E. SACHS.
CAGE RING FOR BALL BEARINGS.
APPLICATION FILED SEPT. 9, 1908.

1,045,193.

Patented Nov. 26, 1912.

Witnesses
Joseph C. Stack.
M. A. Jones.

Inventor
Ernst Sachs
By Julius C. Powell
his Attys.

UNITED STATES PATENT OFFICE.

ERNST SACHS, OF SCHWEINFURT, GERMANY.

CAGE-RING FOR BALL-BEARINGS.

1,045,193.  Specification of Letters Patent.  Patented Nov. 26, 1912.

Application filed September 9, 1908. Serial No. 452,299.

*To all whom it may concern:*

Be it known that I, ERNST SACHS, a subject of the King of Bavaria, residing at No. 24 Schultes street, Schweinfurt, in Germany, have invented a new and useful Improvement in Cage-Rings for Ball-Bearings, of which the following is a specification.

This invention relates to a guide ring or spacer for the balls of ball bearings which is made in two parts, and has reference particularly to the connection of the two halves in which the balls are contained in recesses.

The object of this invention is to provide a reliable connection, but at the same time to arrange the balls as near to each other as possible so that the largest possible number of balls may be used in a bearing. This object is attained by means of devices uniting the two halves and having similar shape and action as the rivets hitherto used and which are introduced into suitable grooves made on the circumference of the guide ring and extending through both halves, special measures being taken for preventing the said connecting devices from falling or being thrown out. The intervals between the single balls can consequently be very small, and the partitions correspondingly thin.

Figure 1:
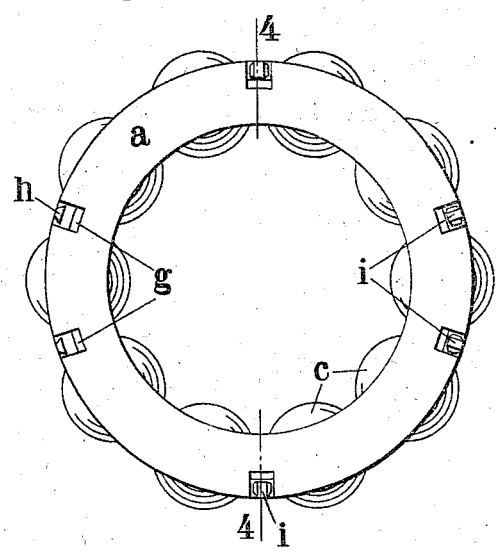
Figure 2:
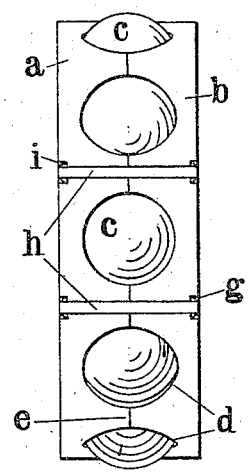
Figure 3:
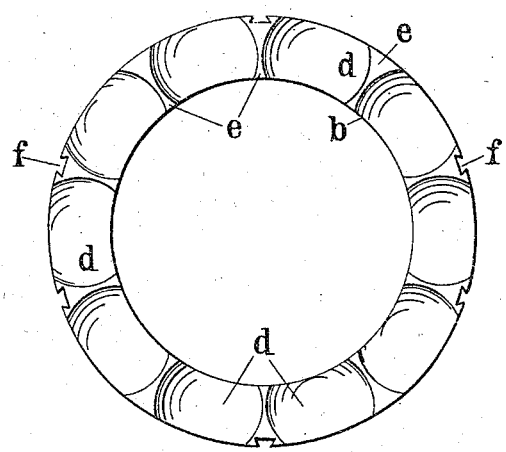
Figure 4:
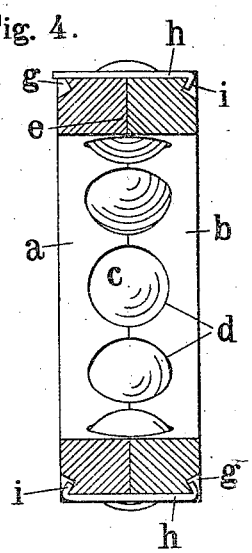
Figure 5:
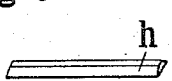
Figure 6:
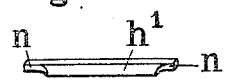

In the accompanying drawing which forms a part of this specification,—Figure 1 a guide ring with the connection in question in front elevation, Fig. 2 a side elevation of the ring, Fig. 3 a front view of the inner side of one half of the ring, Fig. 4 a cross-section on the line 4—4 of Fig. 1, Figs. 5 and 6 are perspective views of two modifications of the connecting means.

Like reference characters designate like parts throughout all figures of the drawing.

The two halves $a$ $b$ constituting the guide ring, provided in their inner meeting faces with recesses $d$ which coincide and in which the balls $c$ are guided, are provided on their outer circumferences with a suitable number of grooves $f$ suitably distributed around the rings and located between pairs of the balls, these grooves being of dove-tailed cross-section or of some other undercut shape, and extending transversely through both rings. These grooves terminate at the ends for instance, in recesses $g$ made on the flat sides of the rings $a$ and $b$. Sections of wire $h$ or the like, of a corresponding, that is to say, in this case trapezoidal cross-section, are pushed into the said grooves and their laterally projecting ends (Fig. 1 on the left, Fig. 4 on the left at the top) are bent down into the recesses $g$, so that they inclose the halves $a$ and $b$ at both sides, and hold them together (Fig. 4 below). The undercut shape of the grooves $f$ prevents the pieces of wire from falling out, and the recesses $g$ act in the same way in the construction illustrated, the recesses being preferably undercut or V-shape so that the bent ends $i$ engage the overhanging lips of the recesses like a hook. In many cases it would be, however, sufficient to use only one of these engaging and retaining means described. This arrangement which acts as a riveted connection enables the distance between the balls to be reduced to such an extent, that the largest possible number of balls can be introduced into the bearing in question, for instance when in a bearing there is room for 11½ balls, the guide ring can be made in such manner that it would guide 11 balls in a reliable manner and protect them from coming into direct contact with each other. The use of an ordinary riveted connection would be impossible in such a case, more particularly when the dimensions of the ball bearing are small, and also in cases in which a large number of small balls is used in a large bearing, as the exceedingly thin partitions $e$ would not contain sufficient material for making the perforations to receive the rivets, so that the holes would be easily broken during boring or riveting or the rivets would partly project into the cells and interfere with the rotation of the balls. Although this method of bringing the balls nearer together is a great advantage of the connection according to this invention, it can nevertheless be also used in guide rings containing balls at a large distance apart, for the arrangement is distinguished by its simplicity and reliability and can be easily effected.

Fig. 6 shows another construction of the connecting means $h^1$ provided at the ends with laterally flattened portions $n$ in order to prevent the jumping up and lateral widening of the rivet which takes place during the bending over, from widening the grooves $f$, and also, when the connection has to be disconnected, in order to enable the rivets, after bending the ends, to be drawn through the grooves in spite of the unavoidable deformation.

As in the case of rivets of ordinary shape, the fasteners *h* could also be provided at one end with a head adapted to engage the notches, only one end being bent down in the manner described. Such a fastener has not been represented, as the arrangement is well known in the art and may easily be copied. For instance, in Fig. 4 the fasteners *h* may be considered as previously formed with the bent heads *i* at one end, though this specific form is not essential. The ends *i* could moreover surround the halves to a greater or less extent. The ring halves in this arrangement may have any shape, nor do I restrict myself to solid metal rings. The said connecting means may be mounted on the inner, instead of the outer, circumference of the spacer, and in some cases at both places.

What I claim as my invention, and desire to secure by Letters Patent, is—

1. A ball-retainer comprising two rings provided with ball-sockets and having transverse undercut grooves in their circumferences, and correspondingly-shaped keys fitted in said grooves thereby rigidly holding the rings together.

2. A ball-retainer comprising two rings provided with ball-sockets and having grooves formed across the circumferences of both rings, and fastening keys fitted in said grooves to prevent relative circumferential displacement of the rings, said keys having their ends embracing and secured to the rings.

3. A ball-retainer comprising two thick rings side by side, having complemental ball-sockets adapted to confine the balls and arranged closely together with thin partitions between adjacent ball-sockets, and having complemental transverse grooves in their circumferences between the ball-sockets, and fastening keys located within the grooves and rigidly uniting the rings.

4. A ball-retainer comprising two rings arranged side by side and having complemental ball-sockets and intermediate complemental transverse undercut grooves, with notches in the outer sides of the rings at the ends of said grooves, and transverse keys fitted in said grooves and having their ends engaging in said notches for securing the rings against separation and relative circumferential displacement.

5. A ball retainer comprising two rings arranged side by side, the same having complemental ball sockets and intermediate grooves extending across the circumferences of both rings, and fasteners located and fitted within said grooves and adapted to engage the sides of the rings with their ends, said fasteners not protruding above the circumferential surface of the rings.

6. A ball retainer comprising two rings arranged side by side and having undercut grooves extending across the circumferences of both rings, and keys fitted and encompassed in the said grooves and adapted to engage the rings with their ends.

7. A ball retainer comprising two rings having ball-sockets formed therein and grooves extending across the circumferences of both rings, the outer sides of the rings being provided with tapering recesses, and fasteners located in said grooves and having bent ends catching into said recesses.

8. A ball retainer comprising two rings with ball-sockets formed therein and arranged side by side, said rings having undercut grooves extending across their circumferences and having tapering recesses in their outer sides, and fasteners fitting in said grooves and having bent ends which engage said recesses.

9. A ball-retainer comprising two rings arranged side by side and having complemental ball-sockets and intermediate grooves extending across the circumferences of the rings, with undercut notches in the outer faces of the rings at the ends of said grooves, and transverse fasteners consisting of keys fitted in said grooves and having their ends bent and engaging in said notches.

10. A ball retainer composed of a plurality of rings having undercut grooves extending across their circumferences, and fasteners consisting of keys of corresponding form fitted in said grooves, the ends of said keys engaging the outer sides of said retainer and thereby holding the rings together.

In testimony whereof I have set my signature to this specification in the presence of two subscribing witnesses.

ERNST SACHS.

Witnesses:
LOUIS MUELLER,
BLASIUS LUTTERSCHMID.